(12) United States Patent
Charles et al.

(10) Patent No.: US 9,075,931 B2
(45) Date of Patent: Jul. 7, 2015

(54) PROCESS AND SYSTEM FOR RENDERING AN OBJECT IN A VIEW USING A PRODUCT LIFECYCLE MANAGEMENT DATABASE

(75) Inventors: Bernard Charles, Feucherolles (FR); Arnaud Nonclercq, Suresnes (FR); Guénolé Gicquel, Courbevoie (FR); Francois Perroux, Chaville (FR); Duy Minh Vu, Paris (FR)

(73) Assignee: DASSAULT SYSTEMES, Suresnes Cedex (FR)

( * ) Notice: Subject to any disclaimer, the term of this patent is extended or adjusted under 35 U.S.C. 154(b) by 125 days.

(21) Appl. No.: 11/312,315

(22) Filed: Dec. 19, 2005

(65) Prior Publication Data
US 2007/0013709 A1 Jan. 18, 2007

(30) Foreign Application Priority Data
Dec. 20, 2004 (EP) .................................. 04293049

(51) Int. Cl.
G09G 5/00 (2006.01)
G06F 17/50 (2006.01)
G06T 19/00 (2011.01)
(Continued)

(52) U.S. Cl.
CPC ............ *G06F 17/50* (2013.01); *G06F 2217/04* (2013.01); *G06F 2217/02* (2013.01); *G06F 3/04845* (2013.01); *G06T 19/20* (2013.01);
(Continued)

(58) Field of Classification Search
CPC ................ G06T 19/00; G06T 2200/24; G06T 2219/004; G06F 17/50; G06F 2217/04

USPC .................. 345/440, 619, 581, 582, 420; 700/97–98
See application file for complete search history.

(56) References Cited

U.S. PATENT DOCUMENTS 4,864,497 A * 9/1989 Lowry et al. .................. 707/102
5,559,942 A   9/1996 Gough et al.
(Continued)

FOREIGN PATENT DOCUMENTS

EP    1324169 A2    7/2003
JP    03-113674 A   5/1991
(Continued)

OTHER PUBLICATIONS

Nemetschek AG: "Neues in Allplan 2004" Allplan. Neues in Allplan, Jan. 2004, pp. 1-195, XP002327420.

(Continued)

*Primary Examiner* — Jin-Cheng Wang
(74) *Attorney, Agent, or Firm* — Baker & Hostetler LLP

(57) ABSTRACT

The invention proposes a process for rendering an object view using a PLM database. The database comprises modeled objects and relations between said modeled objects. Said modeled objects are associated to a set of values of attributes, whose values are stored in the database or computable based on relations involving said modeled objects. The process comprises displaying to the user a view of a set of modeled objects; receiving a selection by a user of an attribute; querying the database for a modeled object to be rendered; providing a value of the selected attribute, associated to said modeled object; and rendering said modeled object in the view according to the provided value of the attribute. It is also possible for the user to select a value of an attribute and the rendering will be carried out only on the object, whose value (s) matches with the selected value.

30 Claims, 9 Drawing Sheets

(51) Int. Cl.
  *G06Q 10/06* (2012.01)
  *G06F 3/0484* (2013.01)
  *G06T 19/20* (2011.01)

(52) U.S. Cl.
  CPC ............ *G06T19/00* (2013.01); *G06T 2200/24* (2013.01); *G06T 2219/004* (2013.01); *G06Q 10/0631* (2013.01)

(56) References Cited

U.S. PATENT DOCUMENTS

| | | | |
|---|---|---|---|
| 5,845,288 | A | 12/1998 | Syeda-Mahmood |
| 5,861,889 | A * | 1/1999 | Wallace et al. ............... 345/619 |
| 6,219,055 | B1 * | 4/2001 | Bhargava et al. ............. 715/850 |
| 6,247,019 | B1 | 6/2001 | Davies |
| 6,556,227 | B1 * | 4/2003 | Gantt ........................... 715/851 |
| 6,573,903 | B2 * | 6/2003 | Gantt ........................... 345/619 |
| 6,611,725 | B1 * | 8/2003 | Harrison et al. ................ 700/98 |
| 6,654,027 | B1 * | 11/2003 | Hernandez ................... 345/619 |
| 6,922,599 | B2 * | 7/2005 | Richey ............................ 700/98 |
| 7,079,990 | B2 * | 7/2006 | Haller et al. ...................... 703/2 |
| 7,127,308 | B2 * | 10/2006 | Bigelow ........................... 700/97 |
| 2002/0087516 | A1 | 7/2002 | Cras et al. |
| 2002/0180735 | A1 * | 12/2002 | Chartier et al. ............... 345/440 |
| 2003/0033041 | A1 * | 2/2003 | Richey ............................ 700/98 |
| 2003/0101025 | A1 * | 5/2003 | Shah et al. .................... 702/188 |
| 2003/0231211 | A1 * | 12/2003 | Shah et al. .................... 345/771 |
| 2005/0021861 | A1 * | 1/2005 | Delarue ........................ 709/246 |
| 2005/0038642 | A1 * | 2/2005 | Rameau et al. ................... 704/1 |
| 2005/0071135 | A1 * | 3/2005 | Vredenburgh et al. ........... 703/1 |
| 2007/0061154 | A1 * | 3/2007 | Markvoort et al. ............... 705/1 |
| 2007/0165021 | A1 * | 7/2007 | Hanke .......................... 345/419 |

FOREIGN PATENT DOCUMENTS

| | | |
|---|---|---|
| JP | 07-036947 A | 2/1995 |
| JP | 09-288690 A | 11/1997 |
| JP | 11-309356 A | 2/1999 |
| JP | 2001-195438 A | 7/2001 |

OTHER PUBLICATIONS

Nemetschek AG: "Neues in Allplan 2003" Allplan. Neues in Allplan, Dec. 2002, page complete, XP002321820.

Nemetschek: "Allplan Version 12 Handbuch Architektur, Teil 1 p. 5.34-6.01 'Makromodellierer', '\ffnungen', Teil 3 p. 1.01-1.47 'Makro'" Nemetschek Programmsystem GmbH, Nov. 1996, p. 5.34-6.01,1.01-1.47, XP002301600 Munich, Germany.

McKinney K et al: "Visualization of construction planning information" 1998 International Conference on Intelligent User Interfaces. IUI '98. San Francisco, CA, Jan. 6-9, 1998, Annual International Conference on Intelligent User Interfaces, New York, NY : ACM, US, Jan. 6, 1998, pp. 135-138, XP002111495 ISBN: 0-89791-955-6.

Van Den Berg E: "Web-based collaborative modelling with Spiff", Aug. 7, 2003, TU Delft, NL , XP002250551, pp. 1-52.

Nospin Group: "Basic Guide to MS Word v6—2000" Free PC Tech Homepage, Online Feb. 23, 2001, pp. 1-6, XP002338520. Retrieved from the Internet: URL: http://web.archive.org/web/20010223232114/http://freepctech.com/pc/002/ms_word_basic.shtml retrieved on Jul. 29, 2005.

Liong, Lim Bio: "MS Spy++ style Window Finder" Codeproject.com, Online, Jul. 13, 2002, pp. 1-12, XP002338525. Retrieved from the Internet: URL: http://web.archive.org/web/20020713035738/http://www.codeproject.com/dialog/windowfinder.asp retrieved on Jul. 29, 2005.

Office Action in corresponding Chinese Application No. 200510136179.4, dated Aug. 4, 2014.

* cited by examiner

PROCESS AND SYSTEM FOR RENDERING AN OBJECT IN A VIEW USING A PRODUCT LIFECYCLE MANAGEMENT DATABASE

CROSS REFERENCE TO RELATED APPLICATIONS

This application claims priority to European Patent Application No. 04293049.5 filed on Dec. 20, 2004, which is currently pending.

FIELD OF THE INVENTION

The invention relates to the field of computer programs and systems, and more specifically to a product lifecycle management database, which comprises data representative of modeled objects.

BACKGROUND OF THE INVENTION

Computer-aided techniques include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of parts or assemblies of parts, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, which in turn allow for a representation to be generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

Also known are Product Lifecycle Management (PLM) solutions, which refer to a strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). For instance, the digital product may be first defined and simulated using an appropriate application. Then, the lean digital manufacturing processes may be defined and modeled.

The PLM solution provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service. Such PLM solutions comprise a relational database of products. The database comprises a set of data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

To this respect, a collaborative workspace can be defined as an interconnected environment in which participants in the product lifecycle (design and also marketing, sales, manufacturing, OEMs, suppliers, and customers) can access and interact with each other's "In-Work" designs, thereby enhancing communication through exchange, direct use, simulation and validation in 2D, 3D or textual environment.

Product data management (PDM) or Virtual Product data management (VPDM) systems refer to tools used to control access to and manage all product definition data, including the manufacturing processes. This is achieved by maintaining product information (or meta-data).

A PDM solution, such as the one sold under the name ENOVIA, may automatically capture and manage product information and facilitates collaboration throughout the enterprise and across the value chain.

It may further integrate people and processes by automating and tracking standard workflows within an organization and its supply chain, driving efficiency and accountability, and facilitating standards compliance.

For example, the user may wish to know where a product, e.g. a braking pedal, is also used, that is, in which other models it is embedded. A standard CAD tools enable a user to navigate between parts or products mainly according to the "is composed of" relation. Databases used in PDM systems enable queries to be made on various types of relation between parts or product and the scope of navigation of the databases is the widest possible. In practice, the user can have access to all the parts, products, assemblies processes, people, and, from a general standpoint, any data related to the manufactured goods through their lifecycle.

Nevertheless, databases do usually not allow the user to easily navigate since the data do not have a graphical representation. Data are identified by file names or types and those names may not be relevant enough to identify precisely the items that the user is looking for.

For the sake of completeness, a database is defined usually as a collection of data or information organized for rapid search and retrieval, especially by a computer. Databases are structured to facilitate storage, retrieval, modification, and deletion of data in conjunction with various data-processing operations. A database consists of a file or set of files that can be broken down into records, each of which consists of one or more fields. Fields are the basic units of data storage. Users retrieve database information primarily through queries. Using keywords and sorting commands, users can rapidly search, rearrange, group, and select the field in many records to retrieve or create reports on particular aggregates of data according to the rules of the database management system being used.

During the various routine steps of design, a user may have to trigger numerous and/or different visualizations of a set of modeled objects in order to better understand it, prepare to take further steps in the design work and, subsequently, check the consistency of his work, etc.

In order to work on a model or a product structure for instance, a user has to be able to know or identify some information parameters of one or more parts of the product such as the name and the locker name of said parts, the maturity level of those parts, and so on. How important is his awareness of those information parameters is increased in the case of a modeling process carried out in a collaborative way, i.e. with other remote users working on and sharing the same model.

In the environment of PLM, the amount of information to be dealt with is considerable. Part of this information may be accessed through the "Properties" option when right-clicking on the relevant part. However, if the user wishes to know locker names and version numbers of various parts, he has to select and check all those parts one at a time. The user may further sometimes ignore the name of the parts, making it difficult to retrieve them. Moreover, not all information is available through said "Properties" option. Thus, the user has to switch to a product data management database in order to retrieve the information parameters, for example, which parts are locked. Once the information is retrieved, he then has to go back to the edition window to keep on working on his project which is time and resource consuming.

There is therefore a need for a better optimized process for modeling an object in the field of PLM, allowing a user to more efficiently access and identify a set of necessary information related to the modeled objects.

SUMMARY OF THE INVENTION

The invention proposes a process for rendering an object view using a PLM database, the database containing modeled objects and relations between said modeled objects, wherein said modeled objects are associated to a set of values of attributes, the values of the set of values being stored in the database or computable based on relations involving said modeled objects, the process comprising:
  displaying to the user a view of a set of modeled objects;
  receiving a selection by a user of an attribute;
  querying the database for a modeled object to be rendered;
  providing a value of the selected attribute, associated to said modeled object;
  rendering said modeled object in the view according to the provided value of the attribute.

In other embodiments, the process according to the invention may comprise one or more of the following features:
  the step of receiving comprises selection by the user of the attribute among preselected attributes;
  the step of displaying comprises displaying to the user a three-dimensional view of the set of modeled objects, including said modeled object to be rendered;
  the process of the invention further comprises, prior to the step of querying, a step of selecting said modeled object to be rendered among the set of modeled objects displayed at the step of displaying;
  the step of rendering comprises displaying a representation of the value of the selected attribute as a label associated to said modeled object;
  the step of querying comprises querying the database for each modeled object of the set of modeled objects displayed at the step of displaying; the step of providing comprises providing, for each modeled object queried at step of querying, a value of the selected attribute, respectively associated to each object of the set of modeled objects; and the step of rendering comprises rendering each modeled object of the set according to its respectively associated value provided at the step of providing;
  the process of the invention further comprises, prior to the step of querying: receiving from the user a selection of at least another attribute, and: the step of providing comprises providing, for each of the attributes received at the step of receiving, a respective value associated to the modeled object to be rendered; and the step of rendering is carried out according to each value provided at the step of providing;
  the rendering of said modeled object to be rendered is carried out according to a color different from a color used for displaying a modeled object of the set of modeled objects at the step of displaying;
  at the step of rendering, rendering each modeled object of the set is carried out using a color respectively associated to its associated value of the attribute;
  the step of receiving comprises receiving a user selection of the attribute via a user-interactive graphical tool;
  the user-interactive graphical tool comprises at least one user-selectable area suitable for user selection of the attribute;
  the attribute selected at step of receiving a selection relates to an object lock/unlock status;
  the lock/unlock status comprises lock/unlock status of a reference of said modeled object to be rendered, lock/unlock status of an instance of said modeled object and/or lock/unlock status of a three dimensional representation of said modeled object;
  the attribute selected at step of receiving selection relates to a modification status of said modeled object;
  the attribute selected at step of selection and relating to a modification status of modeled object has associated possible values corresponding to: modeled object identified as being modified by the user in a current session of the user; modeled object identified as being able to be modified by the user; modeled object identified as not being able to be modified by the user in the current session;
  the process of the invention further comprises, prior to the step of rendering: querying the database for the name of one or more modeled objects to be rendered; providing the name, and the step of rendering comprises displaying a representation of the name of the one or more modeled objects to be rendered;
  the step of rendering comprises, upon action of a user, displaying of one or more of the followings: representation of a maturity level of said modeled object to be rendered according to criteria comprised in the set of values of attributes of said modeled object; representation of a version identifier of said modeled object to be rendered, the version identifier belonging to the set of values of attributes of said modeled object; and representation of an effectivity identifier of said modeled object to be rendered, the effectivity identifier belonging to the attributes of said modeled object;

the user-interactive graphical tool comprises four user-selectable areas, arranged as quadrants, each area being suitable for selection by a user of a respective attribute;

said user-interactive graphical tool is a drag or drag-and-drop tool; and the graphical tool is adapted for both selecting the object to be rendered and receiving a user selection of one or more attribute upon dragging the graphical tool up to or dragging the graphical tool up to and dropping it at a location corresponding to the object to be rendered;

the modeled object to be rendered comprises data related to a product, a product part, 3D representation of a product part or product, a 2D representation of a product, product part, electrical diagram, PERT or GANTT diagram; and the process of the invention further comprises a step of: receiving a selection by a user of a value of an attribute; the step of rendering being carried out according to both the provided value and the received value selected by the user.

The invention further concerns a process for rendering an object view using a product lifecycle management database, the database containing modeled objects and relations between said modeled objects, wherein said modeled objects are associated to a set of values of attributes, the values of the set of values being stored in the database or computable based on relations involving said modeled objects, the process comprising:

displaying to the user a view of a set of modeled objects;
receiving a selection by a user of a value of an attribute;
querying the database for the modeled objects of the set;
providing one or more modeled object, a value of attribute of which matches with the value selected by the user;
rendering the one or more modeled object provided.

Furthermore, the invention is directed to a product lifecycle management system, comprising a database storing modeled objects and relations between said modeled objects, said modeled objects being associated to a set of values of attributes, said values being stored in the database or computable based on relations involving said modeled objects, wherein the product lifecycle management system comprises:

means for displaying to the user a view of a set of modeled objects;
means for receiving a selection by a user of an attribute;
means for querying the database for a modeled object to be rendered;
means for providing a value of the selected attribute, associated to said modeled object; and
means for rendering said modeled object in the view according to the provided value of the attribute.

In other embodiments, the product lifecycle management system of the invention may comprise one or more of the following features:

the product lifecycle management system further comprises a graphical user interface adapted for displaying a user-interactive graphical tool, the graphical tool being adapted for receiving the selection by the user of the attribute;
the graphical tool is further adapted for receiving the selection by the user of various attributes; and
the graphical tool is further suitable for user selection of the object to be rendered.

Various embodiments of the invention are now discussed, in reference to the drawings.

DETAILED DESCRIPTION OF THE INVENTION

Figure 1:
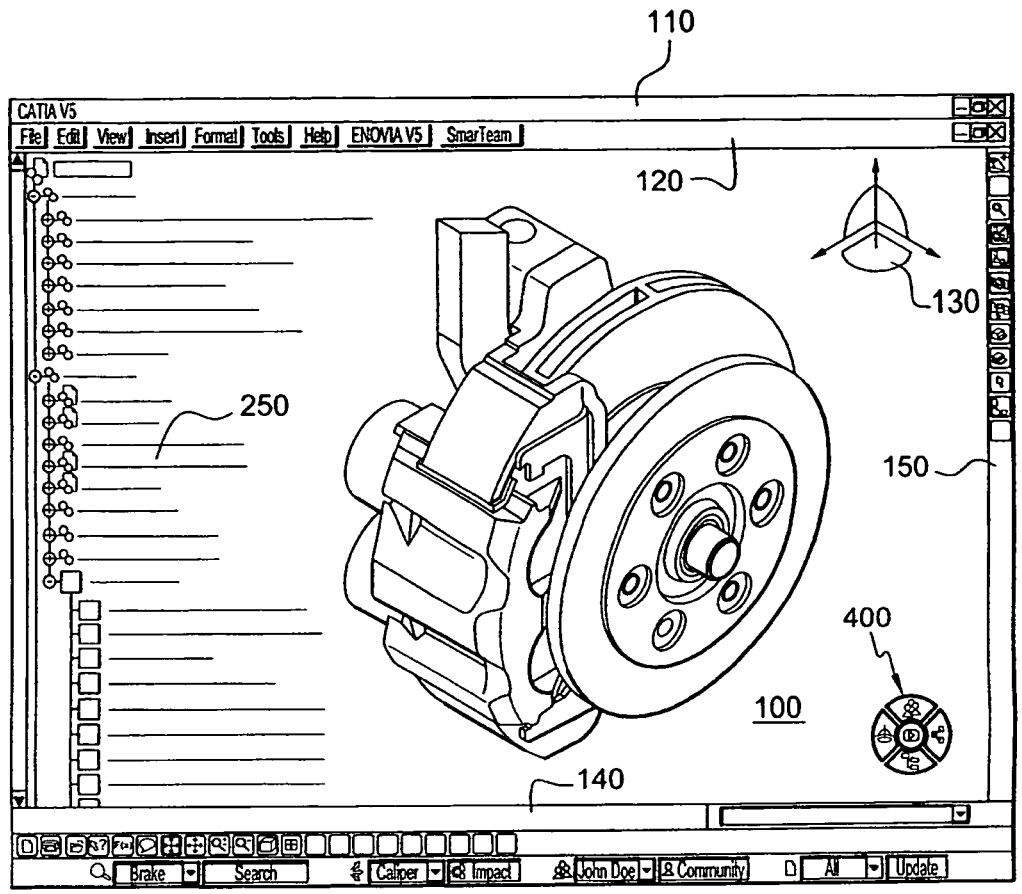
FIG. 1 is an exemplified display of a graphical user interface showing a graphical tool suitable for taking steps in the process of the invention, according to an embodiment of the invention.

The invention proposes a process for rendering an object view using a PLM database. The database comprises modeled objects and relations between said modeled objects. Said modeled objects are associated to a set of values of attributes, whose values are stored in the database or computable based on relations involving said modeled objects. The process comprises displaying to the user a view of a set of modeled objects; receiving a selection by a user of an attribute; querying the database for a modeled object to be rendered; providing a value of the selected attribute, associated to said modeled object; and rendering said modeled object in the view according to the provided value of the attribute.

Still according to the invention, it is also possible for the user to select a value of an attribute and the rendering will be carried out only on the object, whose value(s) matches with the selected value.

The process according to the invention allows for a direct rendering of a given modeled object during a design session, e.g. the user does not have to launch a dedicated application. Further, the process turns versatile as it is possible for the user to select the attribute or a value thereof, possibly among various available attributes or values thereof. Information used for the PLM rendering is stored outside the geometrical model data of the modeled objects (within the set of values of attributes). In addition, using queries in a PLM database allows for a consistent management of the data related to modeled objects.

Notice that "attribute" merely means a type of parameter or variable according to which the rendering process can generally be carried out. However, the rendering step itself makes use of one or more values of attributes, provided according to the process. In this respect and whenever occurring, "displaying an attribute" hereafter means that a representation of one or more values of this attributes is effectively displayed, unless otherwise mentioned.

Besides, the concept of "rendering" needs to be more accurately defined here, in relation to the field of PLM. The result of a "rendering" step denotes an alternate visualization of one or several objects, according to one or several attributes related to this or these object(s), or according to one or several attribute values related to this or these object(s). Though the process of rendering may depend on the value of the attribute, the result itself does not depend on this value. Rather, the PLM rendering further depends on PLM rendering specifications (which may be hard coded or user-defined). Accordingly, the rendering (in the sense of the invention) implies an appropriate operation of the database, in comparison with the existing CAD-like solutions, where parameters are somehow rigidly bound to the objects. As an example, one can imagine an implementation of the invention for which a red part could be rendered as blue, showing that the rendering result of the invention is not rigidly bound to the attributes queried as compared to the rendering techniques known in the art and used in the field of CAD or CAE.

In the field of CAD, the result of a "rendering" step denotes an alternate visualization that is applying to the object visualization attributes (color, transparency level, texture, lighting parameters, and so forth) which show certain characteristics of this object. This may be physical characteristics (for example, an engine will be then rendered with a metallic aspect), or resistance characteristics (the engine will be rendered with color schemes showing its thermal stresses), or possibly other characteristics.

Still in contrast with common CAD rendering, PLM rendering makes it possible to go beyond the physical definition of mere parts or products, making it possible to represent (visualize) any piece of information related to the product life cycle management, and, by extension, any piece of information in general. As an example, one could imagine that PLM rendering could be used to represent (for example in a 3D window), a compact disc catalog based on retrieving the composer name, the song duration, and its creation date, and perform, as we will see it later on, queries on a specific chorus line.

Besides, in the process of the invention, the user is required to select an attribute and the process comprises a further technical step of providing a value of the selected attribute, associated to a modeled object to be rendered. As a result, the progression of the user is made easier thanks to the fact that the latter does not have to first input a value of the attribute, which is not necessarily known by the user. Instead, the user takes note of the value of the attribute thank to the query in the data.

The value of attribute is further preferably stored in the database instead of being computable from relations involving the stored objects. Thus, retrieving the value is made faster as no computation is necessary.

As an example, the forthcoming description mostly refers to the rendering of a product or product part, being understood that the invention further applies to manufacturing processes or resources. For example, the rendering according to the invention may apply to a 3D representation of a modeled object but also to a 2D representation such as drawings, on electrical diagrams, PERT or GANTT diagrams and so forth. The invention may also apply to objects that have a textual or symbolic representations, as well as temporary or computed objects (that is objects which are not stored as such in the data base, but are generated from other objects), such as bounding boxes, the swept volume of a moving object.

In addition, rendering may be carried out through the display of tags or labels attached to the corresponding objects and/or through a modification of the representation of said objects (color, transparency, dotted lines . . . ).

FIG. 1 is an exemplified graphical user interface display according to an embodiment of the invention.

In reference to FIG. 1, the exemplified graphical user interface (or GUI) 100 may be a typical CAD interface, having usual menu bars 110, 120, as well as bottom and side toolbars 140, 150. Such menu- and toolbars contain a set of user-selectable icons, each icon being associated with one or more operations or functions, as known in the art.

Some of these icons are associated with software tools, adapted for editing and/or representing a modeled product 200 or parts of product 200 such as that displayed in the GUI. The software tools in question are grouped in workbenches. Otherwise put, each workbench comprises a different subset of software tools. In particular, one of these is an edition workbench, suitable for editing geometrical features of the modeled product 200. In operation, a designer may for example pre-select a part of the object 200 and then initiate an operation (e.g. change the dimension, color, etc.) by selecting an appropriate icon. For example, typical CAD operations are the modeling of the punching or the folding of a 3D modeled object displayed on the screen.

The GUI may for example display data 250 (known as a feature tree) related to the displayed product 200. In the example of FIG. 1, the data 250 and 3D picture 200 pertain to a brake assembly including brake caliper and disc. Data 250 is displayed in the form of a tree, on the left-hand side of the GUI. The GUI may further show other type of graphic tool 130, for example for facilitating 3D orientation of the object.

As an example of embodiment, the process of the invention may be implemented in a PLM system equipped with a database, in a computer network. The GUI 100 is in this case run on a computer having a display and memory and being further connected to the computer network, which may benefit from a product data manager (PDM) system. The PDM system allows for the management of numerous documents and data, possibly hierarchically interrelated. A plurality of users may thus work in a collaborative way, on different parts/products, using for example similar local applications and a common environment. For instance, GUIs similar to that identified by reference numeral 100 displayed in FIG. 1 may be run on other computers of the network.

The above edition workbench is further preferably adapted for displaying a user-interactive graphical tool 400 within the graphical user interface 100. This user-interactive graphical tool 400 is suitable for user-interaction. In particular, it allows a user for triggering a rendering according to the process of the invention, as will be described more specifically in reference to FIGS. 3-8.

The graphical tool 400 may additionally be adapted for triggering a simulation of a modeled object, such as a simulation of operation of said object, as will be described notably in reference to FIGS. 9-12.

Figure 2:
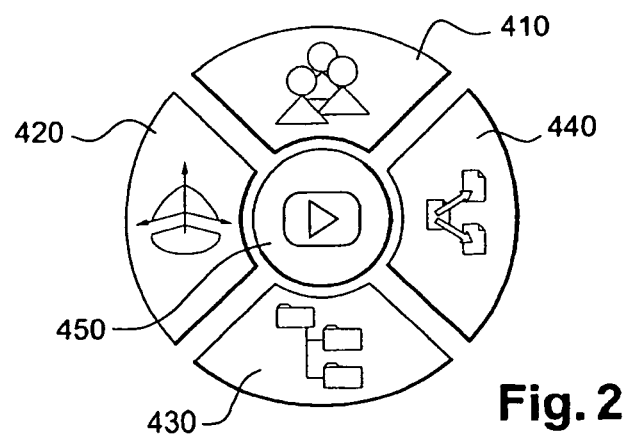
FIG. 2 exhibits a display of the graphical tool of FIG. 1.

FIG. 2 exhibits a display of graphical tool 400 of FIG. 1. As shown in FIG. 2, the graphical tool 400 may comprise user-interactive areas 410, 420, 430, 440, 450, which may for instance be activated by a simple mouse click or by any other pointing device. The areas of the graphical tool are preferably tagged with markers for easier identification and arranged so as to make the graphical tool intuitive and ergonomic. In the example of FIG. 2, the graphical tool has the general shape of a compass (areas arranged in quadrants), so that it will be hereafter denoted either by "compass" or "graphical tool" to mean the same thing. Though such a shape is preferred with respect to its handiness, various other shapes could be provided. Preferably, the compass of the system is intended to be a user-friendly and intuitive tool, notably adapted for providing a temporary information (for example vanishing at next click), useful for guiding the designer through a design session.

The user-selectable areas may be dedicated to various types of functions, such as the rendering of contextual and dynamic information (owner, lock/unlock status, modification status of edited parts, links status of parts/products, part names etc.), as will be further explained in reference to FIGS. 3-8.

Let us recall the steps of the process of the invention:
displaying to the user a view of a set of modeled objects;
receiving a selection by a user of an attribute;
querying the database for a modeled object to be rendered;
providing a value of the selected attribute, associated to said modeled object;
rendering said modeled object in the view according to the provided value of the attribute.

The database comprises modeled objects and relations between said modeled objects. Said modeled objects are associated to a set of values of attributes, whose values are stored in the database or computable based on relations involving said modeled objects. Information used in the PLM rendering is stored outside the geometrical model data of the modeled objects (within the set of values of attributes). Meanwhile, using queries in a PLM database allows for a consistent management of the data related to modeled objects.

The set of modeled objects may preferably consist of products and/or product parts, though the process of the invention may also apply to every 3D representation of a modeled object but also to a 2D representation such as drawings, may also apply to electrical diagrams, PERT or GANTT diagrams, to objects that have a textual or symbolic representations, as well as temporary or computed objects (that is objects which are not stored by themselves in the data base, but are generated from other objects), such as bounding boxes, to the swept volume of a moving object, to processes or resources, etc.

In a preferred embodiment of the invention, the system provides a compass adapted for implementing the process of the invention discussed above. Selection by a user of an attribute may thus possibly be carried out via the graphical tool or compass 400, so as to offer an intuitive and ergonomic tool, making it possible for the PLM system to receive said selection.

As the graphical tool is displayed in the GUI, the process allows for a direct rendering of a given modeled object during a design session, e.g. the user does not have to launch a dedicated application.

Various attributes may preferably be selected from the tool 400, again preventing the user from launching a new application when a new type of rendering is desired.

Figure 3:
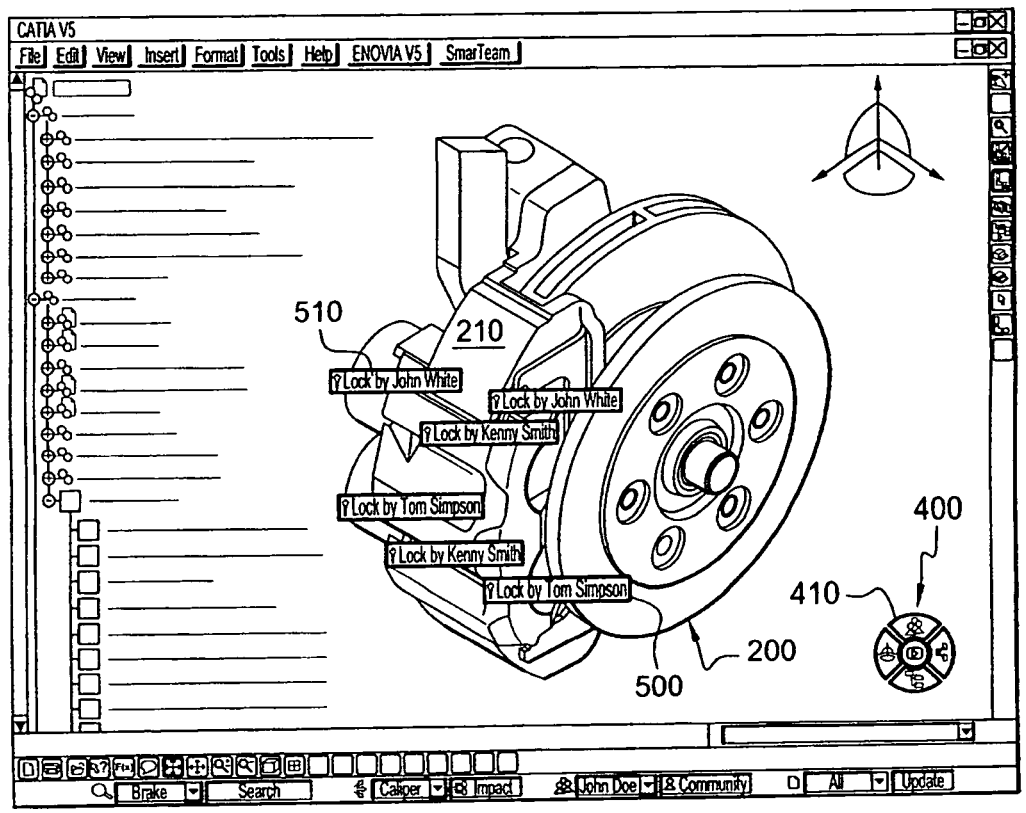
FIG. 3 is an exemplified graphical user interface display when displaying a lock/unlock status of various parts of a product.

FIG. 3 is an exemplified graphical user interface display when displaying a lock/unlock status of various parts of a displayed product.

In this example, the set of modeled object consists of the displayed product 200 and various objects like part 210 are to be rendered. The attribute selected and received relates to an owner lock/unlock status.

For example, a part is locked when the owner of that part is not willing to authorize other users to edit and modify that part.

To achieve this, the user may for example select the appropriate interactive area of the compass, that is, the north quadrant 410 in the example of FIG. 3—let us call this quadrant the "people" quadrant, for the sake of simplicity. Upon selection of this quadrant, the database is queried for one or more objects (here parts like part 500 of the product 200) and a value for the selected attribute is provided, according to the process described above. The rendering comprises in this case the display of a lock/unlock status associated to a given part to be rendered.

To this end, a query is sent to the database in order to retrieve the lock/unlock status of the part(s). More specifically, the database is queried for the objects to be rendered and a value of the previously selected attribute is returned, for each of the objects to be rendered. A possible value may for instance correspond to "locked by another user". Next, at the step of rendering, a representation 510 of the provided value is provided, like for example "locked by John White", next to part 210 in FIG. 3.

In another embodiment, the value of the "lock/unlock status" attribute of each object may comprise, as a value, only the name of the locker. When the query is made, there are three possibilities:
no name is retrieved from the database (the value is empty for the selected attribute), then the object is unlocked;
a name is retrieved but said name corresponds to the name of the user who logged onto the system, then the object is locked by the user himself;
a name is retrieved but said name does not correspond to the name of the user who logged onto the system, then the object is locked by another user.

The lock/unlock status appears preferably next to the corresponding part, together with the part owner name and/or owner picture and the part name.

A color-code could further be applied to the 3D representations of the different parts, upon user selection of the "people" quadrant, which makes the overview easier. For example, a red coloring would stand for "locked by another user", a green coloring would mean "locked by the user himself" and a white coloring would apply when the corresponding part is not locked.

In a further embodiment, it could be possible to first select a part 210 displayed in the GUI 100 and then select a quadrant of the compass (and thus a respective attribute) in order to trigger a display of a representation of a value of this attribute, associated with the selected part only. Instead of displaying all tags of FIG. 3, the user would only see tag or label 510 associated to the previously selected part 210.

Advantageously, the rendering information displayed could then be richer than the rendering information displayed when none of the objects is specifically selected. Complementary information linked with the selected attribute may be displayed for example through the label.

In an embodiment, the user may be able to select any type of label (by a click for example) in order to trigger a function. This may be a chat session with the locker of a part for instance, when selecting the label onto which said locker name is written. For a single part, there may be provided at least three types of representation: one is related to the reference of the part, one is related to the instance and another one is related to the 3D representation itself of the part. The system of the invention may advantageously be configured to display the attributes of all the types of representation of a part, one at a time or together. For example, by default, the system can be configured to render the value of the reference of the object and, upon selection of the user, the value of the instance and of the representation can be also queried and displayed.

In addition, as seen above, the user may select a value of an attribute in order to render only the one or more object that presents the selected value. For example, one could select the value "locked" for the attribute "lock/unlock status" and only the object that have the "locked" value will be rendered, for example thanks to a color code (those objects will be highlighted in red) for instance, or all the other objects will be made transparent.

In an embodiment, the granularity of the set of displayed objects, for example a product of parts, may be set to a lower level, such a rib or a fixing from a part, or, at an even lower level, chamfers, corners, surface limitations, and eventually the object specifications themselves. Depending on the level of granularity, displaying and more generally the processing of the information can be carried out in a more efficient way. Besides, in an embodiment, rendering can be carried out on immaterial objects, that is, not corresponding to a physical entity, such as a volume, for example a volume defined by a moving object. To this aim, specific attributes and associated values can be stored in the database. Alternatively, such values could be computable based on relations stored, involving said modeled objects.

Figure 4:
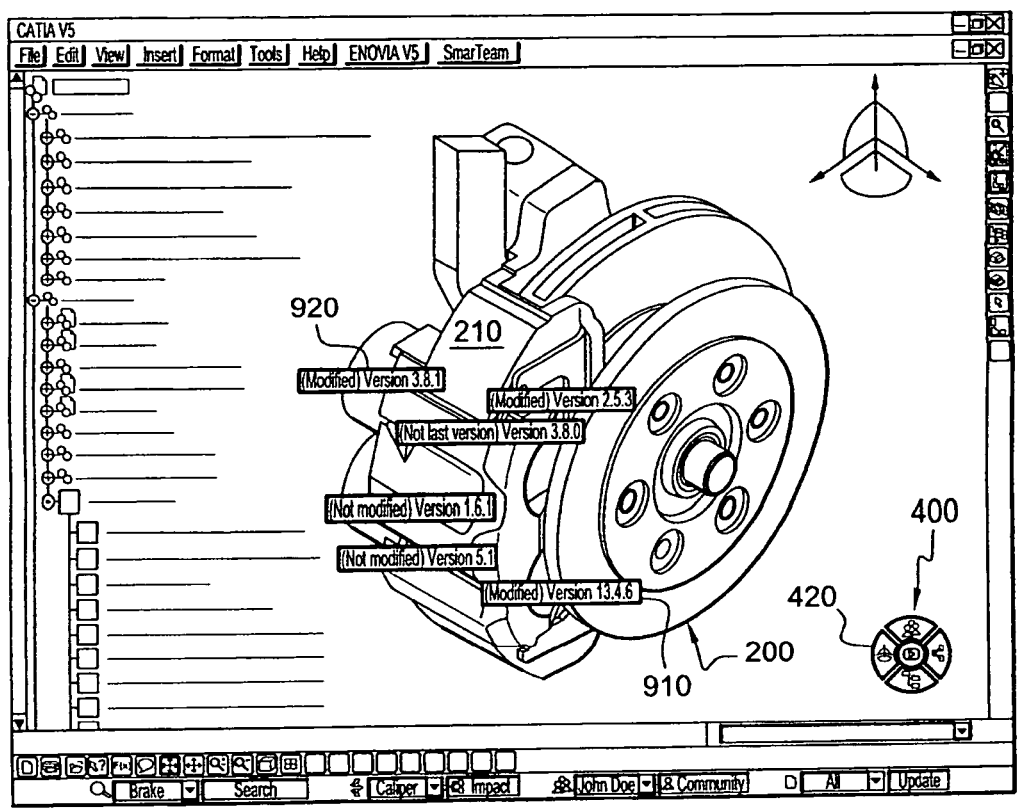
FIG. 4 is an exemplified graphical user interface display when displaying the modification status of parts.

FIG. 4 is an exemplified graphical user interface display when displaying to the user the modification status of the parts loaded in the session.

In reference to FIG. 4, the user-interactive compass 400 is adapted, upon user action, for displaying the modification status of the product or product parts 200, along with the name of said product or parts. This can be attained by clicking on the appropriate compass quadrant, that is, the West (or "form") quadrant 420 in tool 400 exemplified in FIG. 4.

The user-interactive graphical tool or compass 400 is adapted for displaying, possibly using a color coding and upon action of a user, one or more of the following:
  identification of parts modified by the user in a current session;
  identification of parts able to be modified by the user; and
  identification of parts that can not be modified by the user in the current session (keeping in mind that this could apply to a modeled object instead of a single part).

This information is related to the current session of the user only. Nevertheless, the database is queried when the user selects the relevant quadrant.

In the example of FIG. 4, the GUI displays to the user a series of tags or labels 910, 920 showing the various modification status and qualifiers for the various parts of the product. In addition, said modification can be related to the shape of the part, to the positioning of the part, to the reference itself instead of the instance. As explained in reference to FIG. 3, one may also pre-select one part 210 of the product and then select the appropriate area 420 of tool 400, which would result in the tags 920 for the pre-selected product being displayed.

Notice that it could further be possible to use a color code, as already mentioned. Besides, it could be possible to provide that, upon user selection of a given area or quadrant, a legend appears, for example as a pop-up icon next to the compass, so as to ease interpretation of the representation of the values of attributes displayed. For instance, one could provide, upon clicking the west quadrant of the compass, a pop-up legend comprising legend tags such as "new", "modified", "moved", "deleted", etc, together with a color code menu corresponding to colors used in said representation of values.

Figure 5:
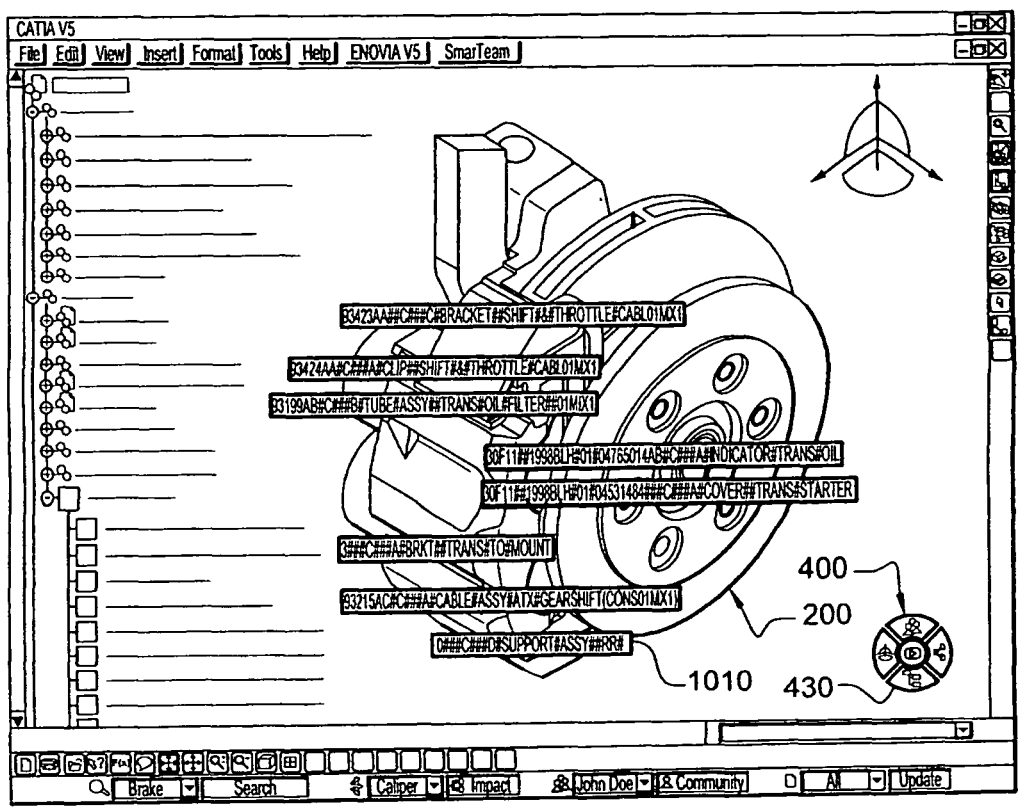
FIG. 5 is an exemplified graphical user interface display when displaying part names as product labels of various parts of a product.

FIG. 5 is an exemplified graphical user interface display when displaying part names as product labels of various parts of a product, in an embodiment of the invention.

In reference to FIG. 5, the product lifecycle database system provides a compass adapted for displaying, upon action of a user, representation of one or more of the following attributes:
  representation of a name of a part, the name belonging to the attributes of the part;
  representation of a maturity level of a part according to criteria comprised in the attributes of the part;
  representation of a version identifier of the part, the version identifier belonging to the attributes of the part; and
  representation of an effectivity identifier, used by the configuration definition.

The effectivity identifier is a Boolean evaluation (right/false) of a formula based on one or more parameters, comprising for instance a rank, date or option. For example, if a user wishes to load from a database a specified airplane of rank 3, dated from 2001 with a single-class layout, the system will search and evaluate among the data a product having an effectivity corresponding to those parameters (rank 3, 2001, single-class layout) in order to provide the user with the selected airplane configuration. In other words, the effectivity is an attribute of a product or a part enabling to check if said product or part matches a specific configuration.

Thus, thanks to the tool 400 of the invention, the effectivity of a selected product or part according to a parameter can be displayed to the user.

Again, this can be achieved by clicking on the appropriate compass quadrant, that is, the South (or "fit") quadrant 430 of tool 400 in FIG. 5, the selection triggering a query in the database in order to retrieve and return the appropriate attributes.

Notice that the representation of maturity of part may be envisaged according to various criteria (typically, % or scale, e.g. from specification, design, first to third level of acceptation, production validation, etc.). The maturity level might further be updated by the user himself during development of parts, possibly in a semi- or full automatic way. Further, the maturity could be color-coded. For example, the 3D representations of the parts may have different colors according to their maturity or their version. As explained in reference to FIGS. 3 and 4, one could here again pre-select one part or several parts in order to limit the display to the information for the relevant part or parts.

As seen, the values of the queried attributes may be rendered through a color coding but also thanks to the tags or labels 1010, each value being associated to an icon or a string of words.

Again, no selection of objects may give a first level of information for all the displayed objects, and the selection of one or more objects provides more information through the rendering of said one or more selected objects.

Figure 6:
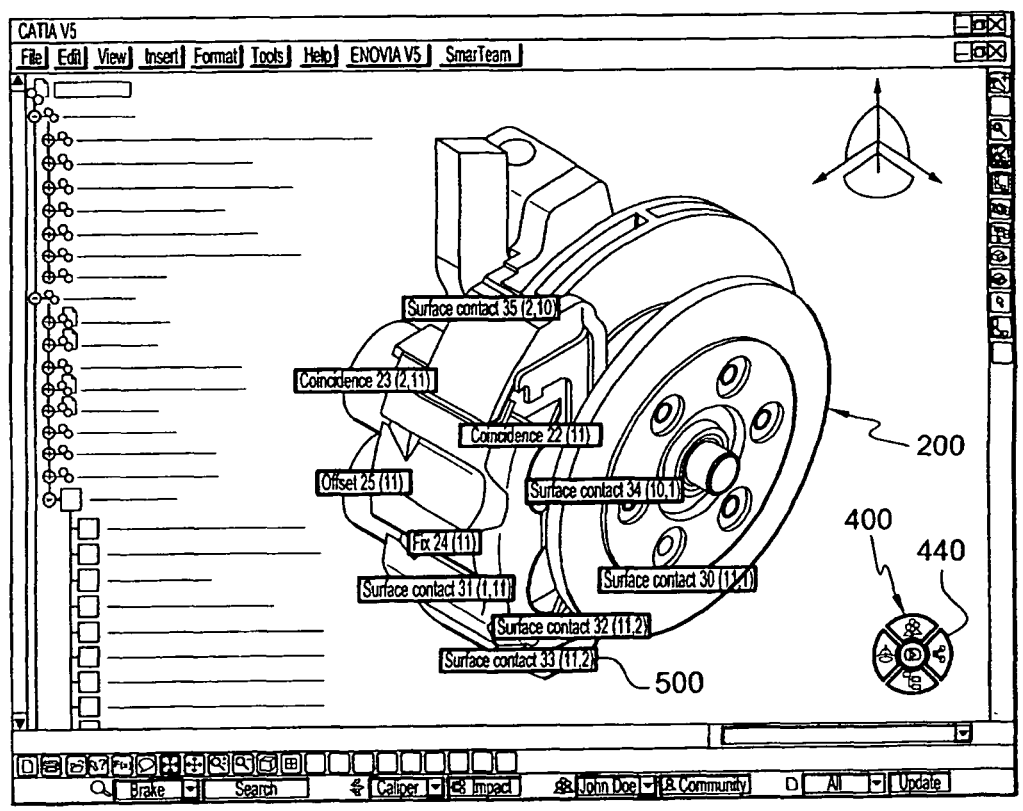
FIG. 6 is an exemplified graphical user interface display when displaying links status of various parts of a product.

FIG. 6 is an exemplified graphical user interface display when displaying links status between various parts of a product, in an embodiment of the invention.

In reference to FIG. 6, the product lifecycle database system according to the invention provides a graphical tool 400 adapted for displaying, upon action of a user, representation of a link status 500 between a first part and other parts, loaded in the session or not, along with the name of the selected part. This is achieved by clicking on the appropriate compass quadrant, that is, the East (or "function") quadrant or area 440 of tool 400. It is thus given the user the possibility to quickly see the links status and especially the synchronization status of the selected parts with respect to parts that impact the selected ones, even if not loaded. As before, one may pre-select one or several parts. Different status may be represented:

links synchronized with parts loaded in the working environment;

links synchronized with parts not loaded in the working environment;

links not synchronized with parts loaded in the working environment;

links not synchronized with parts not loaded in the working environment; and inconsistent links In addition, the user-interactive compass is adapted for displaying an update/non-update status of the link when said link is pointing at another part of the session. All those statuses are retrieved from the database, said database being queried when the user activates the relevant quadrant.

For example, in the case of the brake system 200 with caliper 210, a link to the supporting suspension might be displayed upon user action. When the brake caliper 210 is modified, since there are links to other products/parts, an update of other products/parts will be necessary. The "function" button may therefore indicate if the links are:

updated, in which case the linked products/parts are modified in consistency with the current modifications of the caliper 210;

not updated, that is, the linked products/parts are not modified in consistency with the current modifications of the caliper; or inconsistent links: e.g. the linked product/part does not exist in the database.

Notice that, here again, the above states may be color-coded. Further, since links are directional, in the examples given above, one assumes the links are from the currently active product/part towards the other ones.

Conversely, the display of link may also indicate when the currently active product/part is pointed at by links.

Additional information on the status of the links may be given through labels displayed for each of the queried objects.

Notice that, as mentioned above, the part name may be displayed independently of any specific selection of the user of an associated attribute. In this manner, the name of a part can be rendered together with a representation of a value of any attribute requested by the user. To this end, the process of the invention may further comprise, prior to the step of rendering, steps of querying the database for the name of one or more objects to be rendered and providing a value of the name, said value belonging to the set of values of attributes of said one or more objects to be rendered. The step of rendering thus comprises displaying a representation of the name of the one or more modeled objects to be rendered, possibly together with representations of other attributes selected by the user.

Obviously, other attributes used in the product lifecycle management of an object may be queried such as objects linked to a selected object according to a "is comprised of" relation.

In another embodiment, the product lifecycle database system provides, through the GUI, a user-interactive compass as a drag or drag-and-drop tool, which allows for triggering a display of attributes and information on an object upon dragging the graphical tool up to or dragging and dropping the graphical tool up to a location corresponding to the particular object.

Figure 7:
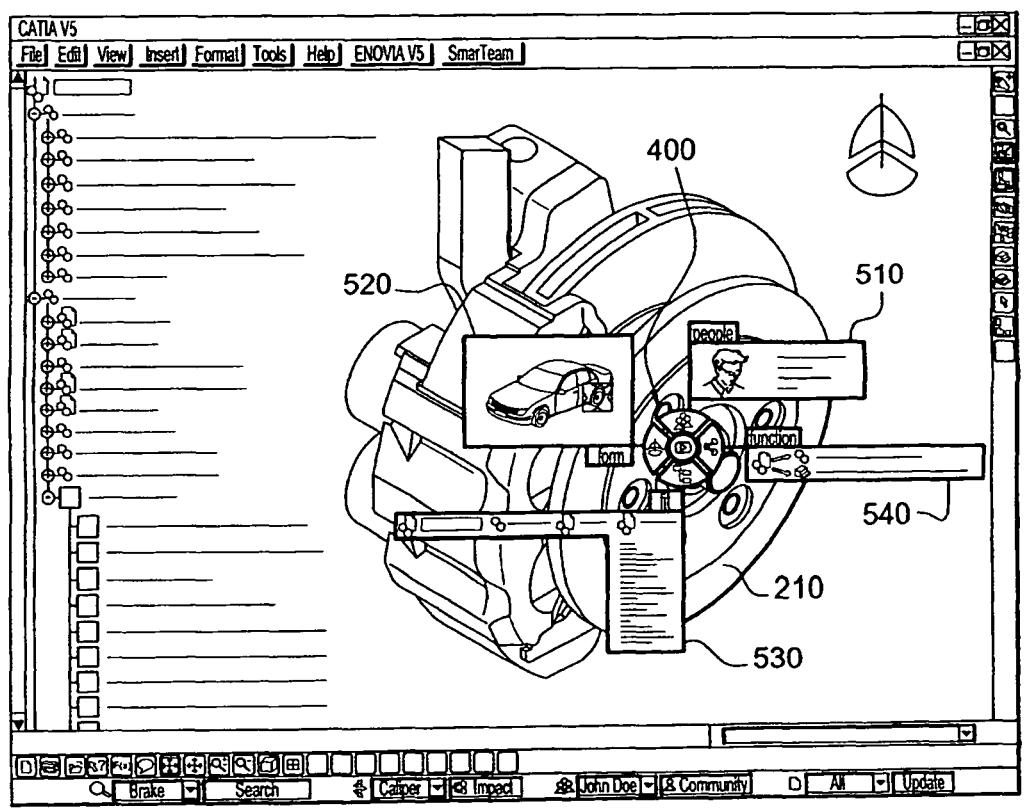
FIG. 7 illustrates a drag-and-drop operation of the graphical tool of FIG. 1 and subsequent display of various attributes or status of parts of a displayed product.

FIG. 7 illustrates a drag-and-drop operation of the graphical tool of FIG. 1 and subsequent display of various values of attributes or information of parts of a displayed product, such as described in reference to FIGS. 3-6. The compass is dragged by the user and dropped at a desired location, corresponding to a particular part. For example, the user may click a mouse button when the mouse pointer points on the compass, hold the mouse button pressed, drag the compass by moving the mouse and drop the compass when releasing the mouse button. Once dropped at the desired location, a set of queries is triggered whereby a set of attributes or information 510, 520, 530, 540, associated with the part, appears next to the compass, close to the relevant quadrant. The general style of display for the set of attributes could for instance be as close as possible to that used when triggering queries such as described in reference to FIGS. 3-6.

Figure 8:
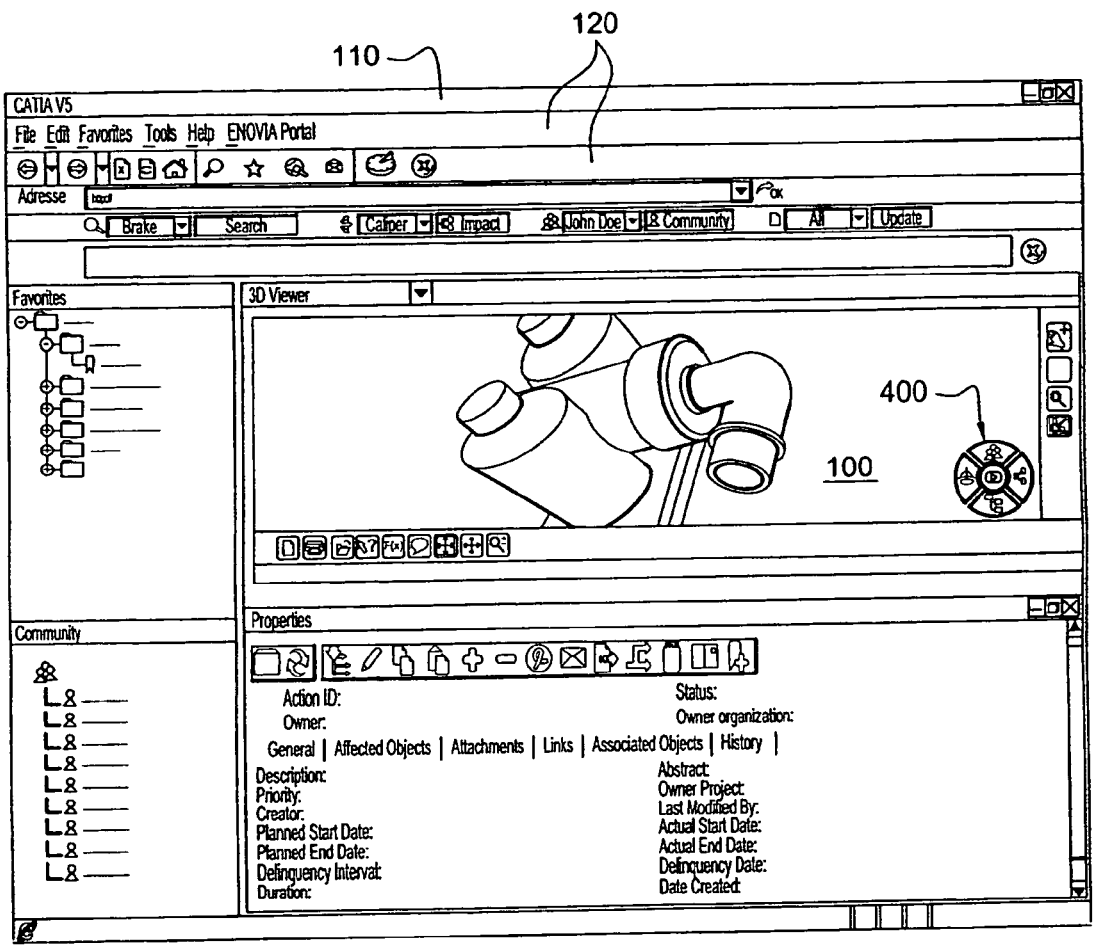
FIG. 8 is an exemplified web-like graphical user interface display with an embedded graphical tool, in an embodiment of the invention.

FIG. 8 is an exemplified web-like graphical user interface display (such as the one of ENOVIA LCA NAV 3dcom from Dassault Systemes) with an embedded graphical tool, in an embodiment of the invention. The GUI 100 is somewhat different in this case, compared to that of FIG. 1. Several graphical tool 130, including the compass 400 may still be immersed in a product display or rendering window. The GUI 100 further comprises a standard menu bar 110, supplemented with a web-like command bar 120. The functions of the compass 400 described in reference to FIGS. 3-6 can also be carried out in such a web-like environment.

Thus, according to the invention, a single graphical tool immersed in an edition workbench or an authoring window of a design application enables the user to select a part to be subsequently rendered according to the process of the invention and, if necessary, query a database in order to launch and play various types of simulation (as will be described hereafter) associated with the object on which he is working on. Such a tool prevent the user from having to multiply the active windows or applications during his design session and improve the efficiency of his work since he is able to check immediately the validity of each iteration of his design through the various simulations.

In a preferred embodiment, the graphical tool has a proactive behavior in order to propose options to the user. For example, if a second user modifies a part that is loaded in the first user session, the tool would trigger a warning for example by way of a pop-up menu or a modification of the relevant quadrant. In this case, the West (Form) quadrant will be highlighted, its color will be changed or it will blink to draw the attention of the first user who will then select said quadrant. That proactive behavior will advantageously be applied to all the quadrants in order to improve the guiding of the user.

The invention is not limited to the embodiments described above. For example, instead of selecting one or more attributes, the user may select:

(i) a first value of an attribute and a second attribute. A second value (corresponding to the second attribute) would then be provided along the process and the rendering carried out according to each of the first and second values. Further, crossing the objects matching with the first and second values allows to focus the rendering on objects matching with both values;

(ii) Similarly, the user could select a first value of a first attribute and at least a second value of a second attribute. Then, the step of rendering could be carried out according to each of the first and second values.

Some explanatory examples follow.

Example of a rendering according to an attribute:

The user selects the "locked" or "lock/unlock status" attribute;

The system then looks for the value of the attribute, i.e. the "locking owner" of each object;

If the owner is the same as the current user, the object is rendered in green; if it is different, the object is red; if there is no locking owner, the object is rendered in white.

Example of a rendering according to a selection of an attribute and an attribute value:

The user loads in his session a current configuration (corresponding to a given attribute value) and selects the "is composed of" attribute;

The system looks for the "is composed of" attribute of each object, then combines the resulting values with the current "configuration" attribute value;

All objects are rendered with a different color for each structural level (for example the car in blue, the engine, body and chassis in green, the cylinder head, block, camshaft in red, and so forth . . . ).

Example of a rendering according to an attribute value:

The user selects the value "aluminum" of the "material" attribute;

The system looks for the "material" attribute of each object;

All aluminum made objects are displayed in green, all objects with no assigned material yet are white, and all other objects are red. In an alternate embodiment, all the aluminum parts are rendered in red and the other parts are made transparent. The aim is to identify the parts that have a value of attribute that matches the selected one.

In the known CAD rendering processes, such a selection of the attribute or the attribute value is not possible. In addition, the rendering would be set to an aluminum-like rendering (metallic aspect, with a high reflectivity, not user-customizable) used for example in the photo realistic rendering.

Example of selection by the user of two attribute values:

The user may select a value "is composed of: an engine", together with a given configuration value, e.g. "Configuration: 2.2 Diesel, 2001";

As a result, the process would specifically render the engine used for the given configuration input above.

As regards the example of selection by the user of two attribute values, this could decompose as steps in which the user first selects an attribute (e.g. "is composed of"), then graphically selects a value (the engine) of this attribute, then select another attribute and so on.

Notice importantly that in a further embodiment, the rendering type is user-customizable or hard coded (as defined by the user or the application, respectively), so as to allow for various types of rendering (as regards the visual result) to be carried out.

Now, concerning the simulation aspects some of the user-selectable areas, for example the central area 450 may allow for triggering a simulation of a modeled object, e.g. part/product, kinematics operation, life cycle, configurations, synchronization of parts, etc., as will be explained now.

In such a case, there is provided a product edition and simulation system, comprising a storage system having data related to modeled objects and a graphical user interface. The graphical user interface has an edition workbench comprising a plurality of software tools suitable for editing a subset of features of the modeled objects. The edition workbench is further adapted for displaying a user-interactive graphical tool in the graphical user interface. The graphical tool is adapted for triggering upon user action a simulation of a modeled object according to a feature not comprised in the subset. The simulation uses a result of a query in the storage system.

The edition and simulation system, for example a PLM database or a file system, thus allows for directly triggering various simulation of a modeled object (for example a product, a part, a resource, a process, etc.) during a design session. For instance, launching an operation simulation of an edited product does not require cumbersome steps such as saving the data, activating a new workbench or a new application window for subsequent simulation launching. Efficiency of a design session is therefore improved in many respects. Further, using queries in a storage system allows for a consistent management of the data related to modeled objects. In addition, the user does not have to be skilled in the technical field, specific wording, techniques used by the simulation workbench in order to successfully perform the simulation. Thus, the user can focus on its task of design, which is readily carried out using a current workbench, wherefrom simulations can be launched whenever needed.

Other aspects of the simulation triggering from the graphical tool 400 will be described in reference to FIGS. 9-12.

Figure 9:
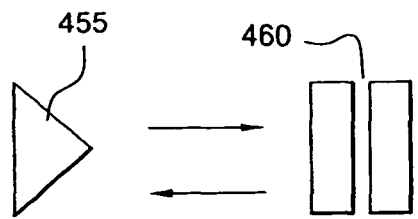
FIG. 9 illustrates schematically an example of a toggle operation of a user-interactive simulation area of the graphical tool of FIG. 2.

FIG. 9 illustrates schematically an example of a toggle operation of a user-interactive simulation area of the graphical tool of FIG. 2.

In order to improve the handiness and intuitiveness of the compass, user action on interactive areas may trigger tools or menus, like pop/pull-up/down submenus for improving the guidance of the designer. This is not exemplified in reference to FIG. 2 or 9, but FIG. 10 shows a marker area 470 which allows the user to pull-down a menu.

In the example of FIG. 9, clicking the "play" marker (initiating a simulation) of the simulation area 450 may instantaneously toggle to a "pause" marker (stop the simulation). FIG. 9 shows at 455 the original icon displayed on the "play" marker 450 of FIG. 2. When this marker is activated by the user, it toggles to the "pause" marker displayed at 460 in FIG. 9. At the same time, the simulation is carried out, as discussed below. The user may interrupt the simulation by clicking again on the marker 450, and at this time, the simulation would be interrupted and the icon would toggle from icon 460 of FIG. 9 to icon 455 of FIG. 9.

Figure 10:
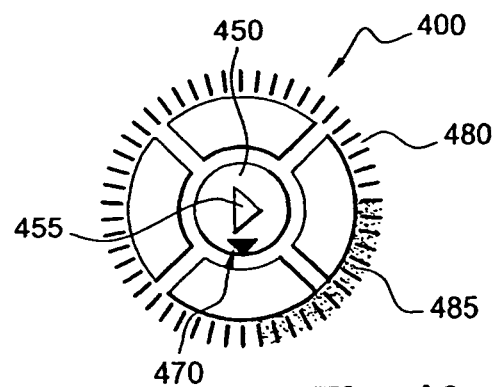
FIG. 10 shows an exemplified display of the graphical tool of FIG. 1 when carrying out a simulation.

FIG. 10 shows an exemplified display of the graphical tool of FIG. 1 when carrying out a simulation.

In FIG. 10, the compass 400 shows four main user-interactive areas or quadrants, dedicated to different types of attributes or information. The central area 450, dedicated to simulation, is tagged with both a "play" marker 455 and submenu marker 470, which may for instance give a user access to a pull-down/up menu, having selectable options allowing a user to refine the simulation features, for example select option related to kinematics, configuration, and life cycle simulation types. Notice that such options in the menu can be updated according to the selected object, the current workbench (defining the current action of the user), the last selected area, for example one of the areas 410 to 440. The compass further shows an endless scroll bar or cursor 480, surrounding the compass, user-selectable (for example from mouse pointer and/or click). Once the simulation has been launched, a color-coded range 485 might appear as to indicate the progress status (for example an elapsed time). Such a scroll bar may either be activated and displayed upon selection of the simulation area, for example by clicking "play" 455 on the central area 450 or be permanently attached to the compass 400. Alternatively, launching a simulation may pop up a more classical player, such as known multimedia players, having standard options like "play", "pause", "rewind", "forward", etc. An advantage of the endless scrollable bar is that it allows for endless backward/forward simulation, though the content itself is limited, which helps the designer in appreciating the simulation.

Figure 11:
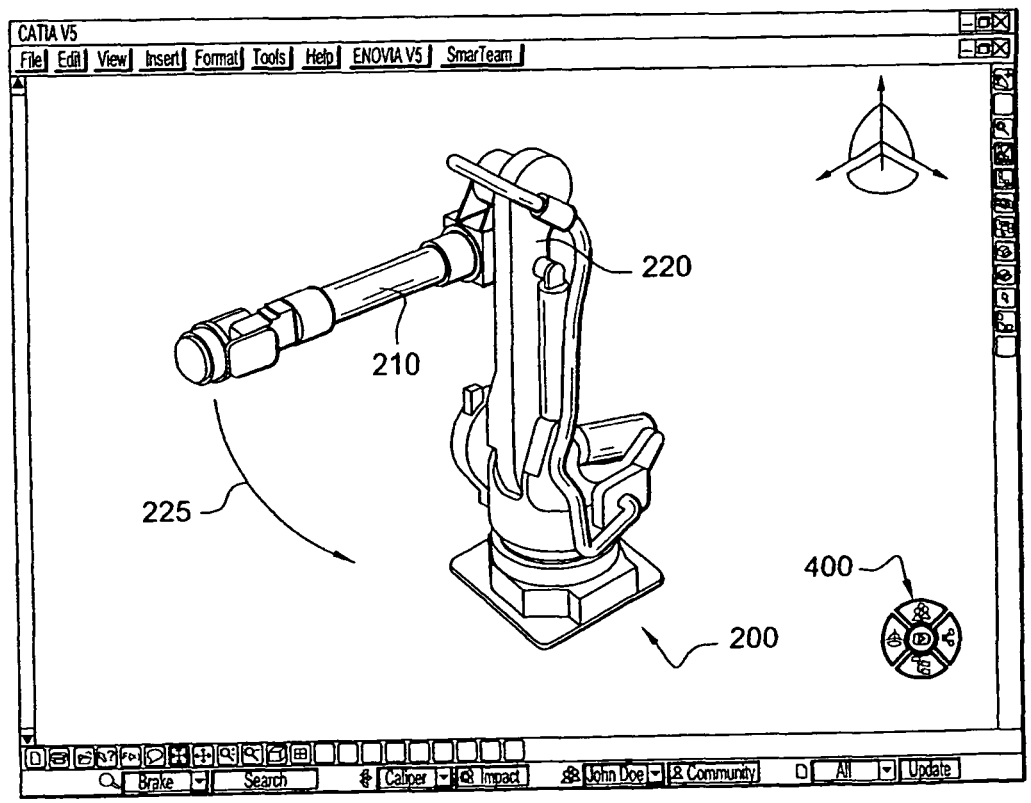
FIG. 11 illustrates a kinematics simulation of a modeled product displayed in the graphical user interface of FIG. 1.

FIG. 11 illustrates a kinematics simulation of a modeled product displayed in the graphical user interface of FIG. 1.

In reference to FIG. 11, the GUI 100 has menu and toolbars 110, 120, 130, 140, 150, 300 similar to those of FIG. 1; the GUI further includes the compass 400. The GUI 100 displays a product 200, which is a modeled robot for automotive industry, comprising notably a first shaft 210, rotatably mounted on a second shaft 220.

After triggering the simulation, a player is launched, which allows for playing the simulation of an operation of the displayed object, such as the kinematics operation rendering of the rotation of the first shaft 210, as indicated by curved arrow 225 in FIG. 11. This is only one type of simulation which is available, as will appear below.

It is to be noted that while the edition workbench comprises software tools suitable for editing a subset of features of the modeled objects, the simulation triggered from the graphical tool uses one or more feature(s) not comprised in said subset. In other words, the simulation launched can be viewed as the display or animation of values of intrinsic features (e.g. those comprised in the above subset) according to extrinsic features (e.g. those not comprised in the above subset). The extrinsic features are not freely settable in edition workbench and are required for carrying out the simulation, regardless of the currently active object. These may for instance comprise a model and/or parameters used for the simulation. Making such extrinsic features independent of the edition workbench provides an improved handiness of the edition and simulation system.

Notice that, the extrinsic features or, at least part of these, may be provided as part of the result returned upon query of the storage system, if necessary. The intrinsic features typically comprise geometric features of a product/part; the extrinsic features or state variables may typically encompass initial speed, gravitational field or initial current.

In order to trigger this simulation, a user may click the appropriate area 450, whereby a query in the PLM database is triggered, which returns a result necessary for carrying out the simulation. The result may for example comprise data or a data location identifier corresponding to simulation parameters such as the simulation player to be used, initial conditions, simulation or ergonomic constraints etc. Notice that such parameters could be stored and updated in the database, from which they are available for a quick launching of the simulation, so that little, possibly no parameterization is required. Notwithstanding, some of the parameters useful for the simulation could still be editable from a workbench, e.g. the edition workbench. Various set of parameters could also be made available from the result returned by the query in the database, comprising for instance defaults parameters, last parameters used etc., allowing a user to quickly re-parameterize the simulation features, possibly while the simulation is being carried out.

The PLM database system may also be configured so as to launch a default simulation player, according to the workbench used for the object editing. Hence, triggering the simulation automatically select an appropriate simulation player. The PLM database system is further preferably configured so as to allow for a specific play behavior if this latter is associated with the object selected for simulation.

At least some of the parameters required for carrying out the simulation may be comprised in or retrieved from the result returned after querying the database. Thus, triggering the simulation requires a minimum number of settings, possibly no setting at all, so that the simulation (for example a kinematics animation as in the example of FIG. 11) can start rapidly upon user action, if not immediately.

Notice that, beyond the simulation of operation of the edited object, it may also be possible to launch simulation of chemical/electrical/physical properties, such a finite element method modeling/analysis of a product or lighting simulation (parts displayed in given light conditions).

The user-interactive compass of the edition and simulation system may be adapted, upon user action, for triggering a simulation (this could be any simulation type, e.g. an operation simulation) of the modeled object before updating said storage system (for example a database) with the modeled objects that have been modified. This makes it possible to stress on the consequences of a change without requiring an update of the storage system, which is time and resources consuming. Once the simulation has been carried out, the user may decide whether to keep the changes or not. This operation can be repeated as much as needed, without requiring the cumbersome step of updating the storage system.

For example, let us consider the brake system 200, including caliper, as displayed in the GUI 100 of FIG. 1. While editing the product thanks to the appropriate workbench or application, a designer may change brake pad dimensions. As a design link between the pad and the caliper exists, a change in the brake pad should impact the caliper. The triggered simulation of operation shows the changes to the various parts. Thus, it makes it possible to change a part (in a current session, without any update of the database) and render the various changes arising due to this change.

The user-interactive compass may further be adapted, upon user action, for triggering a simulation of the update of the storage system with a currently edited part. The simulation of update of the storage system may display the various parts that still need be modified, whatever said parts are loaded or not in the current session of the user. This makes it possible to appreciate the consequences of a change on a more global scale (e.g. beyond the currently edited part) before an effective update of the storage system, which is time and resources consuming, as noted above. Furthermore, other types of simulations may be independently triggered from the compass, such as the simulation of product/part or resource configurations, life cycle (e.g. design iterations, versions), as will be explained below.

Figure 12A:
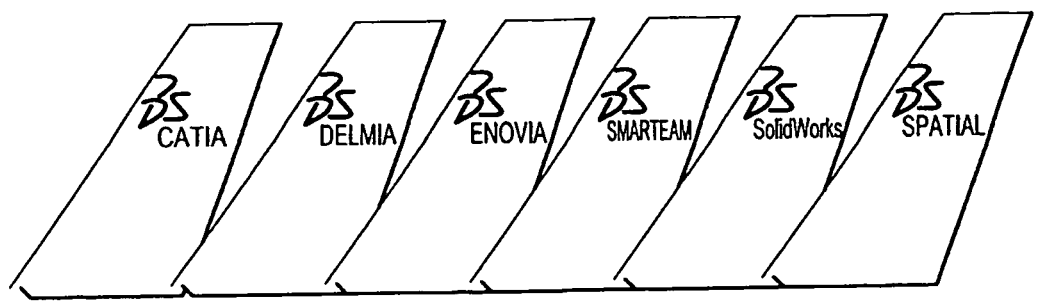
FIGS. 12A and 12B illustrate two simulations of a product, displayed in the graphical user interface of FIG. 1.
Figure 12B:
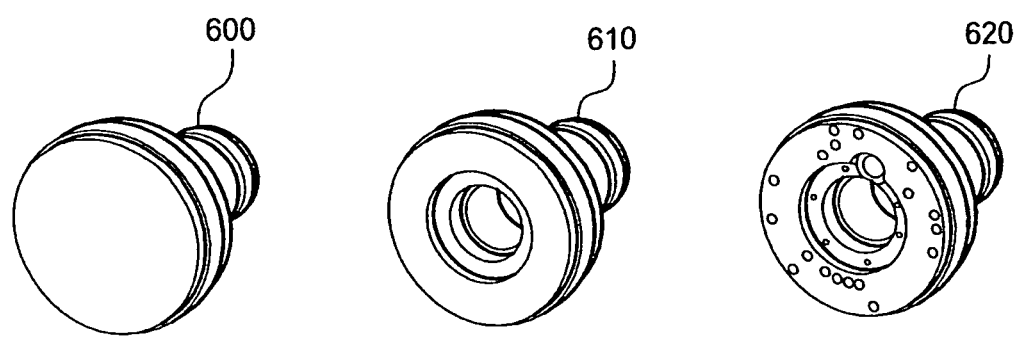

FIGS. 12A and 12B illustrate two different simulations of a product, displayed in the graphical user interface of FIG. 1.

In the example of FIG. 12A, the GUI shows various configuration of the same product—in the example an airplane vertical tail. The FIG. 12A shows six different configurations of the product, which correspond to different clients. The simulation over the various configurations of the product makes it possible for the designer to display all configuration of the same product. Practically, the edition workbench is adapted for allowing edition of configuration features of the edited product or part. Then, the user-interactive graphical tool may be adapted for triggering a simulation of the product or part, using the configuration features. Triggering the simulation will therefore allow a user to navigate among the various configurations, on the basis of the available configuration features. These configurations could be for example commercial configurations, e.g. including different colors and material available for the product, as exemplified in FIG. 12A. The configuration simulation can also provide the user with various seat configurations for a single airplane, for example depending on the "client" specifications. The "client" would in this case be considered as an extrinsic feature, according to the terminology used above. A first airline may wish to have nine seats in a row, while another would prefer six, and a third airline wants five, all those configurations for the same airplane.

It may further be given a user the possibility to navigate among various options or combination of options. For example, in a car, it could be possible to play the various set of configurations available (standard, sport, etc.) or the various design alternatives, possibly by taking into account configuration constraints (for example a sport-like steering wheel should not be used in a standard car). All these configuration features are located in the database of the system, associated to the relevant products or parts. When the user selects a simulation to be played (thanks to the user selectable area 450 for example), a query is sent to the database and a result is returned, allowing the simulation to be performed.

In the example of FIG. 12B the GUI 100 displays three subsequent versions of a product. The simulation shows the design iterations, i.e. the subsequent versions of the product, as they are modified over time. Reference 600 is the earliest version of the product; while reference 610 is an intermediate version of the product and reference 620 is a current version of the product. As shown in FIG. 12B, the various versions of the product are shown, which makes it for example possible to simulate the evolution of the product in its life cycle time. Time would thus be considered as an extrinsic feature used for the versioning simulation. Notice that versioning simulation could also use other extrinsic features such as the type of manufacturing process.

Thus, in addition to the operation and configuration simulations, as described above in reference to FIGS. 11 and 12A, it is possible to play a simulation of the product lifecycle time, that is, to play the various versions of the product (or part), the maturity level of each design iterations, the various milestones of a same product, etc, and this from an unique tool 400. For this, the edition workbench could be made suitable for allowing edition of product lifecycle features of the modeled object while the compass would allow for triggering a simulation of said modeled object, using the above product lifecycle features.

This makes it possible to render the evolution in time of an object from the early stages to all the gates. In particular, it could then be possible to come back on a state of the design of a product or a part on a particular day/date, which allows users to view how said product or part evolved. In this mode, the compass may display, for each selected modeled object and upon user action, the various versions/revisions available, allowing thus a quick understanding of the product lifecycle. As for the configuration simulation, the necessary life cycle features are located in the database of the system, associated to the relevant products or parts. When the user selects a particular simulation, a query is sent to the database and a result is returned, allowing for performing the simulation.

Another possible type of simulation is the simulation of the synchronization of co-designed parts, displayed in the graphical user interface of FIG. 1.

The PLM database system could further be configured so as to allow users to co-design parts of product from various computers of the network, using for example similar CAD/CAM/CAE user interfaces and a common environment. A first user is for example designing a first product part 210 while a second user, in a second session opened on the second user's computer, is working on a second part 220 of the same product.

The user-interactive compass 400 may be adapted for triggering, for example upon action by the first user, a simulation of the edited product 200 comprising the first product part 210 edited by the first user in a current session and the second product part 220 edited by the second user in the second session. Said simulation of the synchronization status of the product will preferably inform the first user that the second part 220 was modified too.

Regarding such a simulation type, distinction should be made between the data associated to the edited part of the first user and that associated to the second part of the second users, as these are not processed the same way. The first data should be regarded as intrinsic data, for example editable from the edition workbench, while the second data are preferably processed as extrinsic data. The second (extrinsic) data are further provided as part of the result returned upon query of the storage system (e.g. a database).

Advantageously, the various parts of the product are color-coded with one color per user during the simulation. Any other type of identification may be used. This facilitates the understanding of the status by the user who triggered the synchronization simulation. When triggering the simulation, a query is sent to the database upon user action on the relevant area of the compass and the result is given on the display.

As a result, the first user is able to view an assembly of parts comprising his own part (e.g. the first one being currently edited) together with one or more other parts, edited by other users. Again, the simulation could preferably be carried out before updating the database with the edited first part, so that no update in the database with the currently edited part is required. In view of the result of the simulation, the first user may afterwards decide whether he should update the database or not.

Notice that although the storage system has been mainly described here above as a PLM database, the storage system may, in an alternate embodiment, simply consist of a file system, which may be sufficient for work on a single computer.

What is claimed is:

1. A computer-implemented process for rerendering an object view using a product lifecycle management database storing contextual and dynamic attributes and a computer system, the database containing three-dimensional modeled objects and relations between said three-dimensional modeled objects, wherein said three-dimensional modeled objects are associated to a set of values of attributes, the values of the set of values being stored in the database or computable based on relations involving said modeled objects, the process comprising:

displaying to the user a three-dimensional view of a set of three-dimensional modeled objects, including at least one modeled object to be rerendered;

receiving a selection by a user of an attribute;

querying the database for at least one of the displayed three-dimensional modeled objects to be rerendered;

providing a value of the selected attribute as a result of the query of the database storing contextual and dynamic attributes associated to said at least one displayed three-dimensional modeled object; and rerendering said at least one of the displayed three-dimensional modeled objects in the view according to the provided value of the attribute;

wherein the step of rerendering comprises displaying a representation of a maturity level of said three-dimensional modeled object to be rerendered, wherein said maturity level consists of percentage or scale of completion of said three-dimensional modeled object, with at least one criteria of said maturity level selected from a group consisting of: specification of said three-dimensional modeled object, design alternatives of said three-dimensional modeled object, first to third level of acceptation of said three-dimensional modeled object, and production validation of said three-dimensional modeled object, wherein said displayed representation of the maturity level being updated by the user in a semi or full automatic way, and wherein said steps are implemented with said computer system.

2. The process of claim 1, wherein the step of rerendering comprises displaying a representation of the value of the selected attribute as a label associated to said at least one of the displayed modeled objects, the label being selectable upon user action in order to trigger a function using the represented value of the attribute.

3. The process of claim 1, wherein the step of receiving comprises selection by the user of the attribute among preselected attributes.

4. The process of claim 1, further comprising, prior to the step of querying, a step of selecting said at least one of the modeled objects to be rerendered among the set of modeled objects displayed at the step of displaying.

5. The process of claim 1, wherein:
the step of querying comprises querying the database for each modeled object of the set of modeled objects displayed at the step of displaying;
the step of providing comprises providing, for each modeled object queried at step of querying, a value of the selected attribute, respectively associated to each object of the set of modeled objects; and
the step of rerendering comprises rerendering each modeled object of the set according to its respectively associated value provided at the step of providing.

6. The process of claim 1, further comprising, prior to the step of querying:
receiving from the user a selection of at least another attribute, and wherein:
the step of providing comprises providing, for each of the attributes received at the step of receiving, a respective value associated to the at least one of the modeled objects to be rerendered; and
the step of rerendering is carried out according to each value provided at the step of providing.

7. The process of claim 1, wherein the rerendering of said at least one of the modeled objects to be rerendered is carried out according to a color different from a color used for displaying a modeled object of the set of modeled objects at the step of displaying.

8. The process of claim 1, wherein the step of receiving comprises receiving a user selection of the attribute via a user-interactive graphical tool.

9. The process of claim 8, wherein the user-interactive graphical tool comprises at least one user-selectable area suitable for user selection of the attribute.

10. The process of claim 1, wherein the maturity level of the displayed three-dimensional modeled object is color-coded.

11. A computer-implemented process for rendering an object view using a product lifecycle management database and a computer system, the database containing three-dimensional modeled objects and relations between said three-dimensional modeled objects, wherein said three-dimensional modeled objects are associated to a set of values of attributes, the values of the set of values being stored in the database or computable based on relations involving said three-dimensional modeled objects, the process comprising:
displaying to the user a three-dimensional view of a set of three-dimensional modeled objects, including at least one three-dimensional modeled object to be rerendered;
receiving a selection by a user of an attribute;
querying the database for at least one of the displayed three-dimensional modeled objects to be rerendered;
providing a value of the selected attribute as a result of the query in the database, the value being associated to said at least one displayed modeled object; and
rerendering said at least one of the displayed three-dimensional modeled objects in the three-dimensional view according to the provided value of the attribute by displaying a representation of the value of the selected attribute as a label being overlaid on said at least one three-dimensional displayed modeled object, the label being selectable upon user action in order to trigger a function using the represented value of the attribute;
wherein said steps are implemented with said computer system.

12. The process of claim 11, wherein the step of receiving comprises selection by the user of the attribute among preselected attributes.

13. The process of claim 11, further comprising, prior to the step of querying, a step of selecting said at least one of the modeled objects to be rerendered among the set of modeled objects displayed at the step of displaying.

14. The process of claim 11, wherein:
the step of querying comprises querying the database for each modeled object of the set of modeled objects displayed at the step of displaying;
the step of providing comprises providing, for each modeled object queried at step of querying, a value of the selected attribute, respectively associated to each object of the set of modeled objects; and
the step of rerendering comprises rerendering each modeled object of the set according to its respectively associated value provided at the step of providing.

15. The process of claim 14, wherein at the step of rerendering includes rerendering each modeled object of the set is carried out using a color respectively associated to its associated value of the attribute.

16. The process of claim 11, further comprising, prior to the step of querying:
receiving from the user a selection of at least another attribute, and wherein:
the step of providing comprises providing, for each of the attributes received at the step of receiving, a respective value associated to the at least one of the modeled objects to be rerendered; and
the step of rerendering is carried out according to each value provided at the step of providing.

17. The process of claim 11, wherein the rerendering of said at least one of the modeled objects to be rerendered is carried out according to a color different from a color used for displaying a modeled object of the set of modeled objects at the step of displaying.

18. The process of claim 11, wherein the step of receiving comprises receiving a user selection of the attribute via a user-interactive graphical tool.

19. The process of claim 18, wherein the user-interactive graphical tool comprises at least one user-selectable area suitable for user selection of the attribute.

20. The process of claim 18, wherein the user-interactive graphical tool comprises four user-selectable areas, arranged as quadrants, each area being suitable for selection by a user of a respective attribute.

21. The process of claim 18, wherein:
said user-interactive graphical tool is a drag or drag-and-drop tool; and
the graphical tool is adapted for both selecting the at least one of the modeled objects to be rerendered and receiving a user selection of at least one attribute upon dragging the graphical tool up to or dragging the graphical tool up to and dropping it at a location corresponding to the at least one of the modeled objects to be rerendered.

22. The process of claim 11, wherein the attribute selected at step of receiving a selection relates to an object lock/unlock status.

23. The process of claim 22, wherein the lock/unlock status comprises at least one of the following: lock/unlock status of a reference of said at least one of the modeled objects to be rerendered, lock/unlock status of an instance of said at least one of the modeled objects and lock/unlock status of a three dimensional representation of said at least one of the modeled objects.

24. The process of claim 11, wherein the attribute selected at step of receiving selection relates to a modification status of said at least one of the displayed modeled objects to be rerendered.

25. The process of claim 24, wherein the attribute selected at step of selection and relating to a modification status of modeled object has associated values corresponding to at least one of:
 modeled object identified as being modified by the user in a current session of the user;
 modeled object identified as being able to be modified by the user; and
 modeled object identified as not being able to be modified by the user in the current session.

26. The process of claim 11, further comprising, prior to the step of rerendering:
 querying the database for the name of at least one displayed modeled object to be rendered; and
 providing the name,
 wherein:
 the step of rendering comprises displaying a representation of the name of the at least one displayed modeled object to be rendered.

27. The process of claim 11, wherein the step of rerendering comprises, upon action of a user, displaying of at least one of the following:
 representation of a maturity level of said at least one of the displayed modeled objects to be rerendered according to criteria comprised in the set of values of attributes of said at least one of the displayed modeled objects;
 representation of a version identifier of said at least one of the displayed modeled objects to be rerendered, the version identifier belonging to the set of values of attributes of said at least one of the displayed modeled objects; and
 representation of an effectivity identifier of said at least one of the displayed modeled objects to be rerendered, the effectivity identifier belonging to the attributes of said at least one of the modeled displayed objects.

28. The process of claim 11, wherein the at least one of the displayed modeled objects to be rerendered comprises data related to a product, a product part, 3D representation of a product part or product, a 2D representation of a product, product part, electrical diagram, PERT or GANTT diagram.

29. The process of claim 11, further comprising a step of:
 receiving a selection by a user of a value of an attribute;
 wherein the step of rerendering is carried out according to both the provided value and the received value selected by the user.

30. The computer-implemented process of claim 11, wherein the step of rerendering comprises displaying a representation of an owner of said modeled object to be rerendered, said displayed representation of the current owner being updated by the user in a semi or full automatic way.

* * * * *